July 25, 1961 J. MUSIL 2,993,399
MACHINE TOOL, MORE PARTICULARLY LATHE
Filed June 9, 1955 5 Sheets-Sheet 1

INVENTOR
JOSEF MUSIL

BY *Otto John Musil*
ATTORNEY

INVENTOR
JOSEF MUSIL

July 25, 1961    J. MUSIL    2,993,399
MACHINE TOOL, MORE PARTICULARLY LATHE
Filed June 9, 1955    5 Sheets-Sheet 5

INVENTOR
JOSEF MUSIL

BY *Otto John Munz*
ATTORNEY 2,993,399
Patented July 25, 1961

2,993,399
MACHINE TOOL, MORE PARTICULARLY LATHE
Josef Musil, 8 Peter Jordanstabe, Vienna XIX, Austria
Filed June 9, 1955, Ser. No. 514,206
Claims priority, application Austria July 21, 1954
12 Claims. (Cl. 82—2)

Lathes are suitable for machining shorter or longer workpieces in dependence on the length of the bed whereas the diameter of the workpiece is limited in lathes by the given height of centers, which determines the maximum turning diameter admissible over the carriage and bed and the swing. The swing can be achieved only with lathes which have a gap bridge. The removal of the gap bridge, however, involves the disadvantage that when reinstalled the bridge cannot, at a rule, be brought into its original position. Independently of this fact the shorter ways of the bed require a considerably larger overhang of the lathe tool from the tool holder so that the tool tends to vibrate during the turning operation; this is apparent from chatter marks on the workpiece.

An increase in the turning diameter over the carriage and bed and of the swing could be achieved by the insertion of a backing below the headstock and tailstock to raise the headstock spindle and the tailstock sleeve fixedly to a higher position. In such an arrangement, however, the resultants of cutting pressure would be displaced considerably outwardly, whereby the tilting moment acting on the carriage is much increased. For this reason the dislocation of the headstock spindle is restricted to about 10–15% of the initial height of centers. Since lathes are dimensioned to ensure the transmission of the resultants of cutting pressure to the ways of the bed when working with the specified height of centers, that vertical adjustment of the headstock spindle by 10–15% will also lead to resultants of cutting pressure which exercise a tilting moment on the carriage. In this case the carriage is prevented from tilting by the protecting gib arranged on the underside of the carriage and applying against the guide surface of the rear way of the bed. Since that protecting gib must have a clearance, the carriage wall will be turned in accordance with that clearance and will be slightly lifted from the rear guideway. As a result a disproportionately large pressure per unit area is applied to the front way, resulting in a higher wear of the carriage and a canting of the carriage during its movement.

The same disadvantage is inherent in another suggestion, according to which the headstock and the tailstock of a lathe are vertically adjustable along a straight line with the aid of a screw spindle. That type of adjustment has been successful only in boring mills.

It is an object of the present invention to eliminate the aforesaid disadvantages and to enable the use of one and the same lathe for larger heights of centers instead of or in addition to the specified height of centers, for machining workpieces at larger turning diameters over the carriage and bed and with larger swings.

The essential feature of the invention resides in the arrangement of the headstock spindle relative to the ways of the longitudinal slide or the guideway of the cross slide for an obliquely upwardly directed height adjustment or dislocation in the sense of the working direction of rotation of the spindle or for an obliquely downwardly directed height adjustment or dislocation opposite to its working direction of rotation, or with an obliquely upwardly directed dislocation of the headstock spindle in its working direction of rotation, relative to a lower height of centers, the transmission of the resultants of cutting pressure to the ways of the bed for the longitudinal slide being retained without or substantially without a tilting moment being exercised on the longitudinal slide.

Thus the height of centers of a lathe can be either fixedly adjusted to a larger value than would correspond to the specified height of centers or can be varied selectively between lower and upper limits whereas the resultants of cutting pressure are still transmitted to the V's of the bed for the longitudinal slide without or substantially without exercising a tilting moment on the longitudinal slide. In this way the height of centers can be increased by as much as 50% above the initial height of centers and if required even by a larger amount. That increase in the working range of a machine tool is possible without using a gap bridge so that a precise and safe guidance of the carriage as far as to the headstock is obtained. Moreover, in spite of the discloration or displacement of the headstock or headstock spindle off the operator, the distance of the latter from the place where the workpiece is machined at its periphery is retained because the turning diameter is increased at the same time. The construction according to the invention further affords the advantage that the width of the bed can be much smaller than before. In the known lathes the width of the bed is about 1.6 to 2 times the height of centers whereas in the construction according to the invention that ratio is increased considerably, down to about 1:1.

The fixed arrangement of the obliquely dislocated headstock spindle has many advantages, which reside mainly in the fact that in a type of lathe designed for a certain height of centers a larger height of centers can be fixedly adjusted as desired while the safe transmission of the resultants of cutting pressure to the ways of the bed is retained. This also provides for a lathe which may have a narrower bed and smaller carriage than a conventional lathe having the same height of centers. In the case of a fixed arrangement of the headstock spindle the oblique dislocation may be effected by mounting the headstock placed on the bed. Alternatively the headstock may be mounted on the wedge so as to be dislocatable, e.g. by fixing screws, or adjustable, e.g. by a screw spindle.

The oblique adjustment may be effected according to the invention along a straight or curved, suitably circular path. In the latter case the center of the arc lies in or near the headstock. In the case of an adjustment along a straight line the resultants of cutting pressure for turning diameters over the carriage can be kept in the same plane.

The tool and workpiece gripping devices displaceable along the bed, e.g. the tool holder of the carriage, the tailstock and the steadies, can be dislocated or adjusted in agreement with the headstock spindle.

In a development of the lathe according to the invention in the case of a bed having ways for the longitudinal slide on different levels, i.e. in the case of a longitudinal slide which is downwardly inclined from the operator's side or apron, the headstock is transversely, e.g. horizontally dislocated or adjustable or dislocatable relative to the bed, which is preferably immovably fixed on its support or integral therewith. By the transverse dislocation or adjustability of the bed or headstock the height of centers can be varied while the perfect transmission of the resultants of cutting pressure to the bed is ensured. The bed may be adjusted along a straight path, which is downwardly inclined towards the apron or operator's side of the machine tool, or which may be horizontal; in the latter case the guideway for the cross slide is upwardly inclined towards the apron or operator's side of the machine tool.

In the drawings:
FIG. 1 is an elevational view, partly in section, of a lathe embodying the invention, wherein the headstock spindle is mounted for adjustment in and along the arc of a circle;

Figure 1:
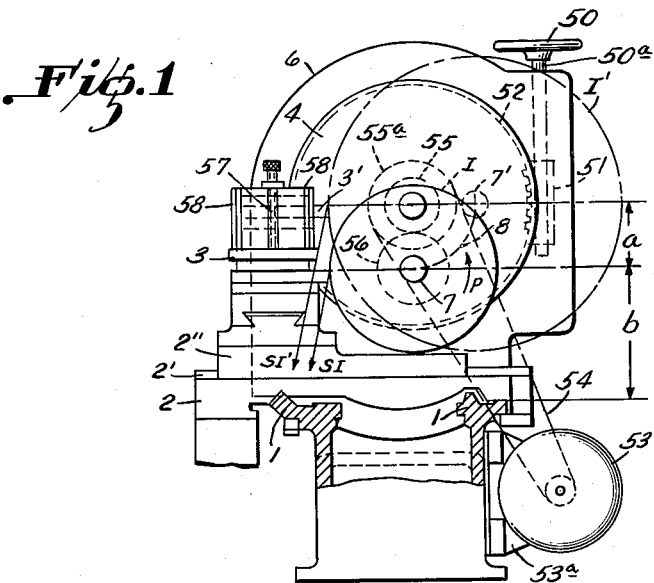
Figure 2:
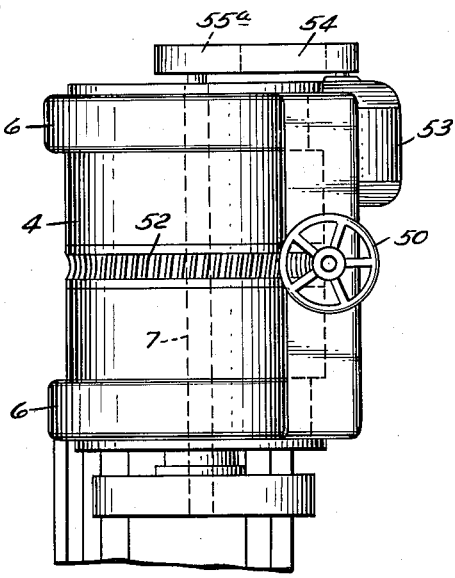
FIG. 2 is a plane view of a headstock corresponding to FIG. 1, but with the tool holder and slide omitted.

According to FIGS. 1 and 2 the longitudinal slide 2 is slidable on the ways 1 of the lathe bed and has guides 2' for the cross slide 2" provided with the tool holder 3. In FIG. 1, numeral 4 designates the cylindrical headstock, which is mounted in the headstock housing 6 for rotation on the axis 5, relative to which the headstock spindle 7 is eccentric and parallel.

From FIG. 2 it is noted that the headstock 4 has worm gearing 52 formed in its central exterior surface, the teeth of which are engaged by a worm 51 fixed to a vertical shaft 50a journaled in headstock housing 6 and having a handwheel 50 affixed to its upper end, so that by actuation of the handwheel, the headstock spindle 7 may be moved from its lowermost position along the arc of a circle 8 to the position 7', in which it is arranged in the same horizontal plane as the axis 5. At the same time the headstock spindle has increased its distance from the ways 1 by the amount $a$, which corresponds to the distance of the axis 5 from the axis of headstock spindle 7.

A suitable spindle drive is shown upon FIGS. 1 and 2, to comprise a motor 53 mounted upon a bracket 53a fixed with the lathe bed and having a pulley driving, by means of a belt 54, a pulley 55a journaled on headstock housing 6 coaxial of axis 5, that is the axis of adjustment of cylindrical headstock 4. This pulley is fixed upon the same shaft as a gear 55 within the housing, which gear is in mesh with a second gear 56, fixed to, and driving, headstock spindle 7. Thus, as handwheel 50 is turned to adjust spindle 7, gear 56 "walks around" gear 55 while continuously remaining in mesh therewith.

In FIGURE 1, $b$ designates the height of centers of the lathe in the lowermost position of the headstock spindle. By turning the headstock with the spindle to position 7' the height of centers is increased by the amount $a$. Since the distance between the carriage and spindle axis in a horizontal direction is also increased by the amount "$a$," the resultants of cutting pressure are maintained adjacent to the front way of the carriage if the resultants of cutting pressure are considered in relation to the carriage. The resultants of cutting pressure referred to hereinafter should be understood in that sense. The tool holder 3 is also adjusted by the amount $a$ to position 3'. Vertical adjustment of the tool may be effected by any known mechanism and shown, merely by way of example, as a pair of vertical guides 58 engaging and guiding the tool for vertical adjustment and a vertical screw 57 threadedly engaging the tool and journaled in the holder so that by turning the screw, the vertical position of the tool relatively to the ways may be adjusted by a distance "$a$." Alternatively any well-known vertically adjustable tool holder may be used such as those disclosed in United States Patents Nos. 102,278; 152,965; 192,499; or 1,552,577.

Circle I corresponds to the turning diameter over the carriage, SI designates the appertaining resultant of cutting pressure obtained when workpieces are being turned while the headstock spindle 7 is in its lowermost position. Circle I' designates the turning diameter over the carriage when the headstock spindle has been swung through 90 deg. to position 7' and SI' illustrates the position and direction of the appertaining resultant of cutting pressure. The maximum overhang of the cross slide 2" over the lathe bed, determining the turning diameter over the carriage, is indicated in FIGS. 3 and 4 by the broken line $x$—$x$.

Figure 3:
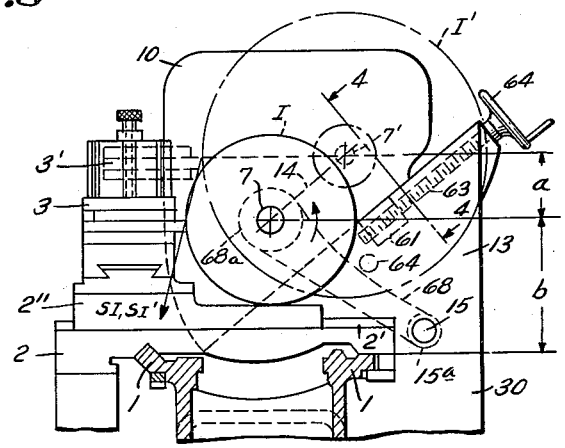
FIG. 3 is an elevational view, partly in section, of a second form of lathe embodying the invention, wherein the headstock and its spindle, are mounted for translation in a direction normal to the spindle axis.
Figure 4:
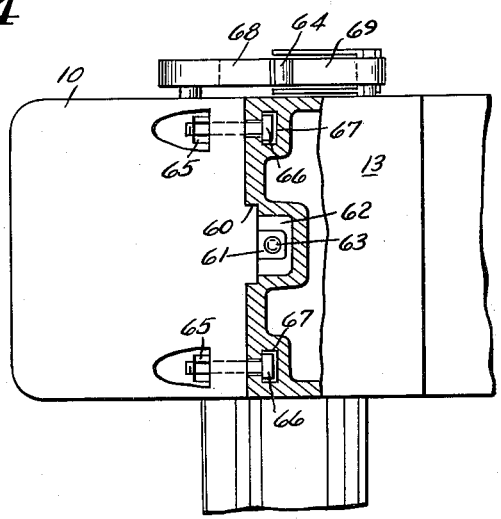
FIG. 4 is a view partly in section in a plane identified by line 4—4, FIG. 3, and showing details of the construction by which the headstock is translated as aforesaid.
Figure 5:
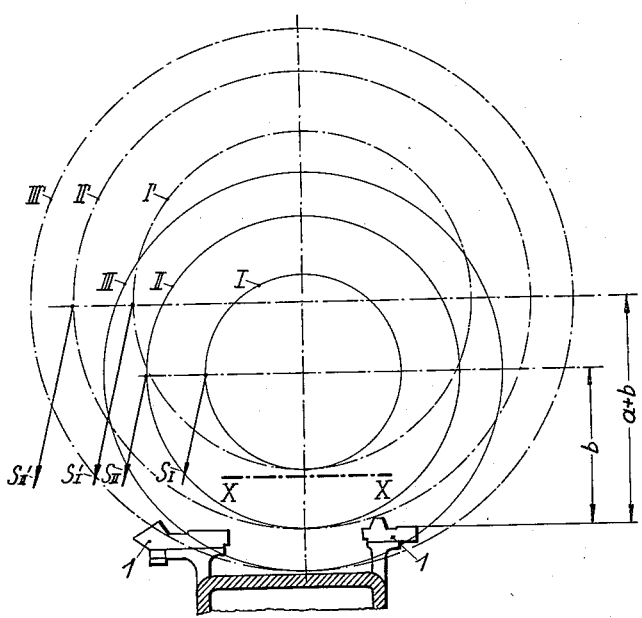
FIG. 5 is a schematic view of the prior art, showing the wide variations in the positions in planes normal to the ways of tool reaction forces on work pieces of correspondingly varying diameters.

A second embodiment depicted upon FIGS. 3 and 4, comprises a wedge 13 fixed with the lathe-bed and ways 1 and having parallel undercut guideway 67, FIG. 4, defining a plane parallel with the axis of spindle 7 and extending upwardly at an acute angle away from the spindle. Headstock 10 has members shown as heads 66 of bolts 65 slidably fitting the respective guideways so that the headstock is mounted for guided translation in and along a direction parallel with the plane of the guideways.

A threaded shaft 63 is journaled in wedge 13, parallel with and between guideways 67, and has a handwheel 64 fixed to its exposed outer end. This shaft threadedly engages an apertured lug 61 fixed with and depending from headstock 10 so that, in a manner obvious from inspection of FIGURES 3 and 4, turning of handwheel 64 translates headstock 10 in a direction parallel with the aforesaid plane, so that its spindle 7 may be adjusted to a position from that shown in solid lines, to a position indicated at 7'. In this case the resultant cutting pressure forces SI, SI' obtained during turning over the carriage, can be kept in the same plane, for all adjustments of the headstock along line 14, between the limiting positions of the spindle, as identified at 7 and 7', respectively.

In FIGURES 3 and 4, spindle shaft 7 may be driven by a pulley 68a fixed therewith, from a belt 68 also passing about a pulley 15a fixed on shaft 15. Shaft 15 is driven from a motor, not shown, but carried by a bracket fixed with wedge 13. Belt 68 passes beneath and in contact with, an idler pulley 64, journaled in a yoke 69 pivoted on the axis of shaft 15 and spring-urged downwardly against the belt by means not shown. Thus, as the headstock is translated from the full-line position shown, upwardly and outwardly, the idler moves correspondingly against the urge of its spring means, and maintains the belt at all times under driving tension.

Vertical adjustment of the tool may be effected in the same manner as has been previously described for the model shown upon FIGURES 1 and 2.

Figure 6:
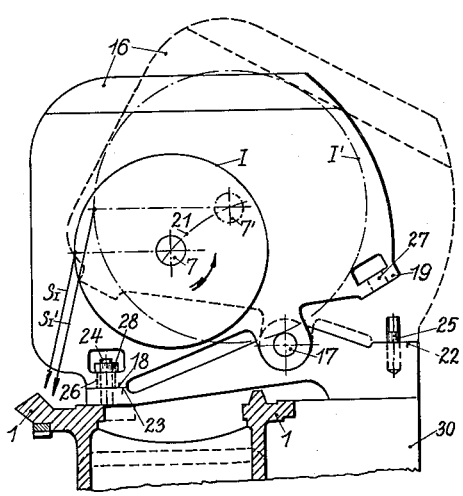
FIG. 6 is an elevational view, partly in section showing a third embodiment of the invention wherein the lathe spindle moves in the arc of a circle to adjust it for work pieces of larger diameter.

FIG. 6 shows another adjustment of the headstock, particularly for lathes having a small height of centers. According to FIG. 6 the headstock 16 is pivotally movable like a rocker on an axis 17 extending over the ways of the bed 1 and is supported in its end positions, corresponding to spindle positions 7 and 7', by the engagement of its bearing surfaces 18 and 19, with surfaces 23 and 22 respectively, on the lathe bed. The headstock spindle describes an arcuate path 21 having its center on the axis 17. From the resultants of cutting pressure at the limiting turning diameters I and I' over the carriage, reaction forces exercised thereby on the workpiece produce a turning moment in the clockwise sense, whereby the headstock 16 is forced against the fixed counterface 22 of the lathe bed in spindle position 7', whereas it tends to lift from the fixed counterface 23 of the lathe bed in spindle position 7. To locate the headstock 16 in its end positions 7 and 7' the bed is provided with bolts 24, 25, which pass through bores 26, 27 in the headstock and hold the headstock 16 by means of nuts 28. The fixation by the screw 25 may be omitted because in spindle position 7' the reaction forces of the resultant of cutting pressure force the headstock 16 against the surface 22, as has been described. For the two limiting spindle positions 7 and 7' according to FIGS. 1 to 3 and 5 the gripping means for the workpiece, such as three-jaw chucks, faceplate, dogplate, or the like, may be made in two different sizes or may be dislocatable or adjustable in agreement with the headstock spindle.

From FIGS. 1 to 4 and 6 it is apparent that the height adjustment or dislocation of the headstock spindle according to the invention is effected in the sense of the working direction of rotation of the spindle (arrow P) whereas the downward displacement is effected in the opposite sense. Thus the positions to which the headstock spindle is adjustable in height are behind the vertical plane through the initial positions 7, viewed in the direction from the tool slide. An oblique downward adjustment of the headstock spindle behind that plane from an uppermost position, i.e. symmetrically to FIG. 3 is also within the scope of the invention.

In the illustrated embodiments having a pivotally movable headstock the axis about which the headstock is pivotally movable is situated above the ways 1 of the bed, preferably in the headstock itself.

Alternatively the headstock spindle 7 may be fixedly arranged in the obliquely dislocated position whereby a lathe designed for a lower height of centers is fixedly adjusted to a larger height of centers, e.g. by the insertion of a wedge 13 (FIG. 2). This applies also to the embodiments having a relatively adjustable headstock spindle, according to FIGS. 9 and 10.

Figure 7:
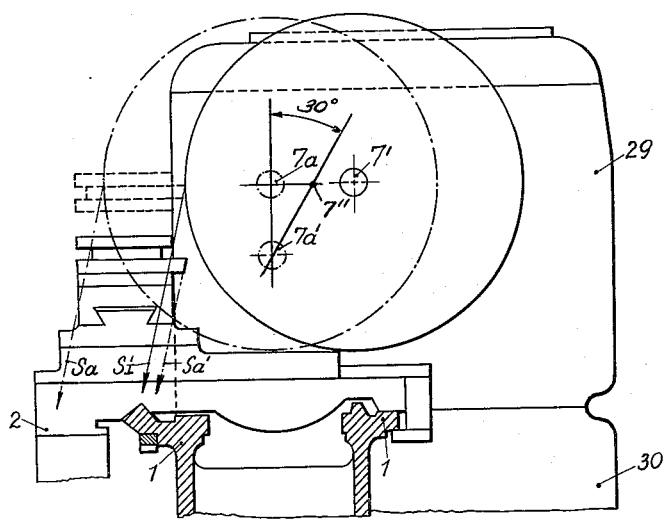
FIG. 7 is an elevational view, partly in section, showing a third embodiment of the invention, wherein the headstock spindle is mounted for translation in a fixed headstock, toward and from the tool slide.
Figure 8:
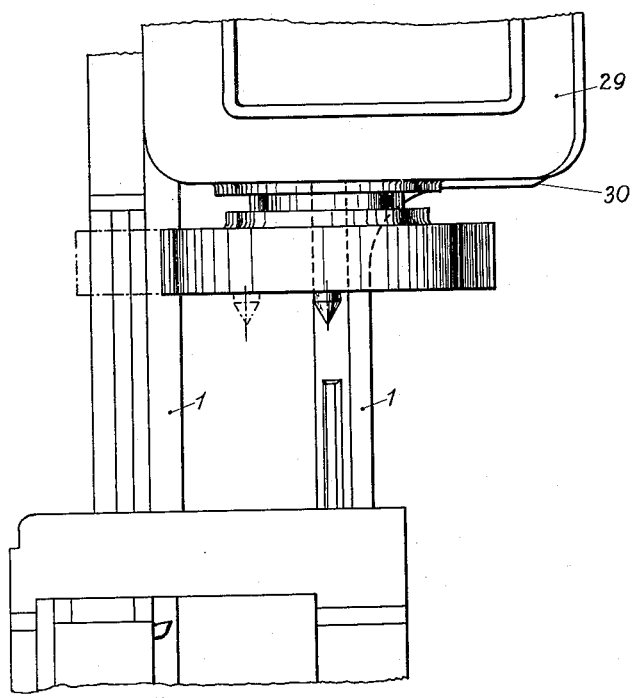
FIG. 8 is a plan view corresponding to FIG. 7.

It is apparent that for the fixed arrangement of the headstock spindle the wedge 13 may be omitted and the headstock be constructed as a unit. Such an embodiment is shown in FIGS. 7 and 8. According to these figures the headstock 29 is rearwardly dislocated relative to the bed or ways 1 in order to provide for a larger height of centers. Thus the headstock spindle assumes the position 7', in which it lies approximately over the rear way 1 so that the resultant of cutting pressure SI' is transmitted to the bed. The position of the headstock at a lower height of centers, when the resultant of cutting pressure Sa' is obtained, is indicated with broken lines at 7a'. The headstock spindle in position 7' is obliquely upwardly dislocated compared to position 7a'. Moreover, FIG. 6 compares the position 7' with the headstock spindle in that position, shown with broken lines at 7a, in which it would be disposed in the previously known constructions having the same height of centers. This construction, however, would not be suitable for that height of centers but for a much smaller one. In FIG. 6 the vertical is shown by the line from 7a' to 7a. Positions of the spindle which fall in the vertical or in the adjoining 30° sector have resultants of cutting pressures Sa lying considerably outwardly of the bed and thus have the disadvantages mentioned in the description. By the arrangement according to the invention, however, the proper application of the cutting pressures to the bed is secured.

The expression "basic height of centers" for purposes of this application means the height of the centers of conventional lathes wherein the resultant of the cutting pressure on the cutting tool acts on the front longitudinal slideway of the bed when turning the maximum diameter which can be swung over the saddle.

As has been mentioned hereinbefore the construction according to the invention permits of a relatively narrow bed. In the previous lathes the ratio of bed width to height of centers is 1.6:1 to 2:1. Owing to the favorable position of the resultants of cutting pressure according to the invention that ratio is reduced considerably, down to about 1:1, in conjunction with a maximum height of centers.

Since, in the embodiment shown at FIGS. 7 and 8 the headstock is rearwardly dislocated or adjustable relative to the bed or ways 1, the lathe is provided with an enlargement or extension 30 below the headstock or with a third upright wall to support the latter. Thus the lathe bed merges into that enlargement at the head end. A similar extension 30 is apparent from FIGS. 3 and 6.

Figure 9:
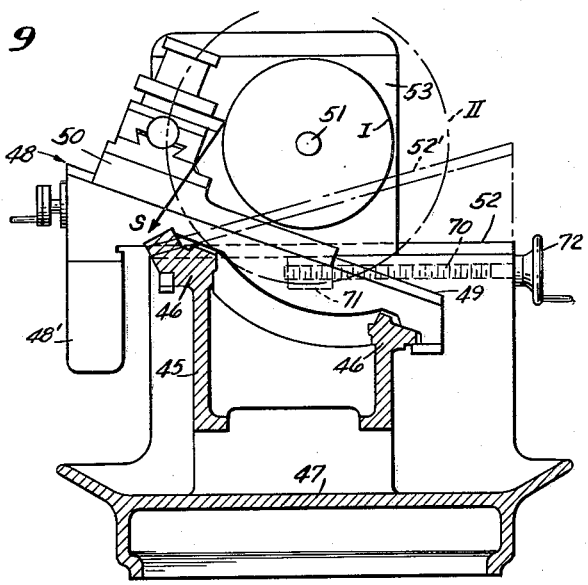
FIG. 9 is an elevational view, partly in section, of a fourth embodiment of the invention, wherein the ways of the lathe are at different elevations, while the headstock is translated in a horizontal direction normal to the direction of extent of the ways.
Figure 10:
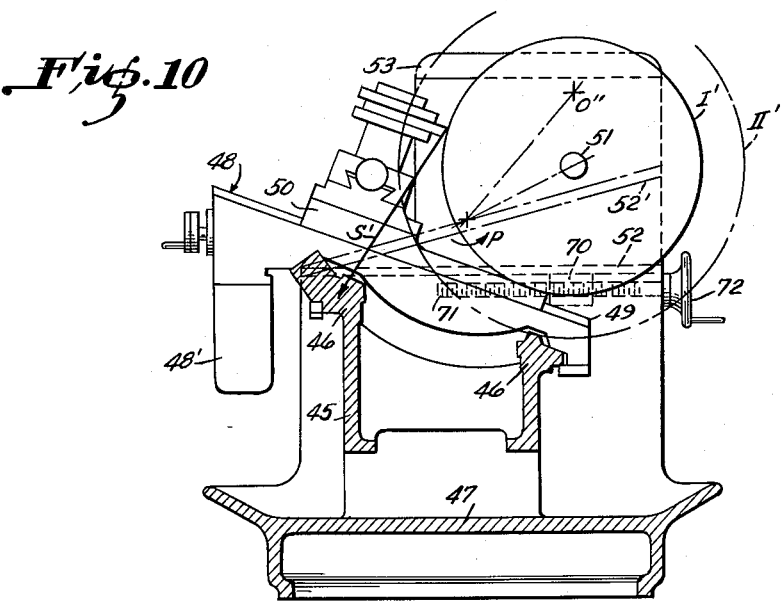
FIG. 10 is a view corresponding to FIG. 9, but showing adjustment of the headstock and tool rest for a work piece of larger diameter.

In the embodiment according to FIGS. 9 and 10 the bed 45 with its ways 46 for the longitudinal slide 48 is integral with its support 47. The ways 46 are on different levels, so that the longitudinal slide 48 is downwardly inclined when viewed from the operator's side or apron 48'; the same applies to the cross slide 50 and its guideway 49. The headstock 53 with the headstock spindle 51 is slidable and can be locked on a horizontal slideway 52. Owing to the inclined guideway 49 for the cross slide 50 or the arrangement of the ways 46 for the longitudinal slide 48 on different levels, the horizontal displacement of the headstock 53 from the position of FIG. 8 to that of FIG. 9 will cause an oblique upward adjustment of the headstock spindle 51 from 0 to 0' (FIG. 9) relative to said guideways, in the sense of its working direction of rotation (arrow P). That oblique adjustment is related to ways 33 on the same level, to enable a comparison.

In the embodiment being described, adjustment of the headstock to translate the spindle axis between positions 0 and 0' may be effected by mechanism essentially like that previously described in connection with FIGS. 3 and 4. That is, bed 47, or a part rigid with the bed, is provided with guideways similar to 67, FIG. 4, and positioned upon respective opposite sides of and substantially parallel and coplanar with, a threaded shaft 70, journaled for rotation only in the bed or part fixed thereto. This shaft has threaded engagement with an apertured lug 71 fixed with, and depending from headstock 53, so that, in a manner clear from inspection of FIGURES 9 and 10 rotation of shaft 70 by turning of its attached handwheel 72, effects adjustment of the headstock over the range of spindle positions 0 to 0'.

The slideway 52 may also be upwardly or downwardly inclined from the horizontal. In the case of a rising slideway, indicated in FIGS. 8 and 9 by the inclined dash-and-dot line 52', a substantial increase, e.g. a doubling of the height of centers (spindle position 0") may be achieved compared to the displacement of the headstock on a horizontal slideway. If the slideway is downwardly inclined when viewed from the apron 48' the angle of inclination from the horizontal must be smaller than the dihedral angle included between the horizontal with a plane through the ways 46 for the longitudinal slide 48, which ways are arranged on different levels. The embodiment according to FIGS. 8 and 9 is suitable for short as well as for long lathes.

In conjunction with the relative adjustment, dislocated or fixedly dislocated arrangement of the headstock spindle according to the invention the position of the tailstock is varied analogously with that of the headstock spindle. Steadies may be of bipartite construction, one part being adjustable in height along straight and/or curved paths. To adapt the tool height to the increased height of centers the carriage may be provided with a vertically adjustable tool holder of any well-known type such as those previously identified.

The two ways such as 1, FIGURE 2, have respective parallel guide surfaces on which the longitudinal slide is supported and by which it is guided for translation on and along the ways. These guide surfaces substantially define or determine a plane which is horizontal in the species of FIGURES 1, 2, 5 and 6, and tilted in the species of FIGURES 8 and 9. Also it is clear from the disclosure that these two guide surfaces define and determine a plane area lying between them and of indefinite extent in the direction of extent of said surfaces. The claims should be read with the foregoing in mind.

According to the provisions of the patent statutes, I have explained the principle and construction of my invention and have illustrated and described what I now consider to represent its best embodiment. However, I desire to have it understood that, within the scope of the appended claims, the invention may be practised otherwise than as specifically illustrated and described.

I claim:

1. In a lathe, a bed, guide means carried by said bed and determining a plane reference area, said guide means being adapted to support and guide a tool for translation in a first direction parallel with said plane area, a headstock, a spindle journaled in said headstock for rotation on a first axis, and means mounting said headstock on said bed with said first axis parallel with said first direction and for movement in a guided limited path in a plane normal to said first direction, the line connecting the termini of said limited path making an angle of less than 90° with said plane area.

2. A lathe as defined in claim 1, said line making an angle with said plane area of the order of 45°.

3. In a lathe, a bed, first and second transversely-spaced, parallel ways fixed with said bed and including respective first and second guide surfaces defining a first plane, a slide mounted on and by said surfaces for translation on and along said ways in a first direction parallel with said first plane, a headstock, a work spindle journaled in said headstock for rotation on an axis parallel with said first direction, a tool holder adjustably fixed with said slide for translation therewith and adapted to hold a tool for operation on a workpiece rotated by said spindle, and guide means mounting said headstock on said bed for adjustable movement parallel with a second plane normal to the axis of rotation of said spindle and said first plane, the direction of said movement making a dihedral angle with said first plane of less than 90°, whereby said headstock may be fixed in adjustment along said direction, to increase the swing over said ways.

4. In a lathe, a bed, first and second transversely-spaced, horizontal ways fixed with said bed and including respective, first and second guide surfaces defining a fixed plane, a longitudinal slide supported on and by said ways for guided translation therealong parallel with said plane, a cross slide mounted on said longitudinal slide for guided translation thereby parallel with said plane and at an angle to said ways, a tool holder adjustably fixed with said cross slide, a headstock, a spindle journaled in said headstock, and means mounting said headstock on said bed for rotation of said spindle on an axis parallel with said plane and for adjustment with respect thereto in a direction normal to the axis of rotation of said spindle and making a dihedral angle of less than 90° with said plane.

5. A lathe as recited in claim 4, said last-named angle being of the order of 45° throughout the range of adjustment of said headstock relatively to said bed.

6. In a lathe, a bed, front and rear, horizontal, spaced, parallel ways fixedly mounted on said bed and having respective first and second guide surfaces defining a plane area between them, a longitudinal slide mounted by said ways for translation in a first direction on and along said guide surfaces, a cross slide, means mounting said cross slide on said longitudinal slide for translation in a second direction normal to said first direction and parallel with said plane area, a tool holder adjustably fixed on said cross slide, a headstock, a work spindle journaled in said head- stock for rotation on an axis parallel with said first direction, and means mounting said headstock on said bed for guided movement parallel with a plane normal to said first direction and in a third direction making a dihedral angle of less than 90° with said plane area, the reaction of a tool in said tool holder on a workpiece mounted for rotation with said spindle passing substantially through said plane area for all positions of adjustment of said headstock in said third direction.

7. A lathe comprising a bed, first and second spaced ways fixed on said bed and having respective first and second parallel guide surfaces defining a plane area between them, a longitudinal slide mounted on said surfaces for guided translation in a first direction along said ways parallel with said plane area, a tool holder, means mounting said tool holder on said slide for translation in a second direction parallel with said plane area and normal to said first direction, a headstock, a work spindle journaled in said headstock for rotation on an axis parallel with said first direction, and guide means fixed with said bed and mounting said headstock for translation in a third direction normal to said first direction and making a dihedral angle of the order of 45° with said second direction.

8. In a lathe, a bed, first and second ways fixed on said bed in parallel spaced relation and having guide surfaces defining a plane area between them, a slide mounted on said surfaces for translation therealong in a first direction parallel with said plane area, a tool holder, adjustably fixed on said slide, a wedge fixed on said bed and having a straight guide surface extending at an angle less than 90° to said plane area, in a plane normal said plane area, a headstock held to said guide surface for translation therealong, and a spindle journaled in said headstock for rotation on an axis parallel with said first direction, said guide surface being constructed and arranged so that the line of reaction force of a tool in said tool holder acting on a workpiece rotated by said spindle passes substantially through said plane area for all positions of adjustment of said headstock therealong.

9. A lathe comprising a bed, forward and rearward ways fixed with said bed in spaced parallel relation, said ways each having a respective guide surface defining a plane area between them, a longitudinal slide mounted on said surfaces for guided translation therealong in a first direction parallel with said plane area, a tool holder, means mounting said tool holder on said slide for movement relatively thereto in a second direction normal to said first direction, a headstock having a guide surface arcuate about a first axis, a spindle journaled in said headstock for rotation on a second axis, both said axes being parallel with said first direction, said second axis being offset with respect to said first axis, and means fixed with said bed and slidably engaging said arcuate guide surface to mount said spindle for adjustment about said first axis.

10. A lathe as defined in claim 9, adjustment of said spindle including a range between first and second limiting positions wherein said spindle is coplanar with said first axis vertically below and horizontally to the rear thereof, respectively.

11. In a lathe, a bed, first and second ways fixed with said bed in horizontal, spaced, parallel relation, said ways having respective longitudinal guide surfaces defining between them a plane area, said surfaces being adapted to mount a tool for translation therealong in a first direction parallel with said plane area, a headstock, a spindle journaled in said headstock for rotation on a first axis parallel with said first direction, and means fixed with said bed and mounting said headstock for pivotal movement about a second axis parallel with and offset from said first axis.

12. A lathe as defined in claim 11, said second axis being positioned substantially above said second way.

(References on following page)

References Cited in the file of this patent

UNITED STATES PATENTS

| | | |
|---|---|---|
| 12,747 | Horn | Apr. 17, 1855 |
| 506,398 | Henley | Oct. 10, 1893 |
| 630,077 | Schauer | Aug. 1, 1899 |
| 1,258,136 | Needham | Mar. 5, 1918 |
| 1,280,215 | Hardinge | Oct. 1, 1918 |
| 1,307,520 | Schurger | June 24, 1919 |
| 1,325,424 | Sundstrand | Dec. 16, 1919 |
| 1,327,604 | Booth | Jan. 6, 1920 |
| 1,393,115 | Groene | Oct. 11, 1921 |
| 1,835,733 | Walker | Dec. 8, 1931 |
| 2,080,830 | Mobius | May 18, 1937 |
| 2,370,384 | Williamson | Feb. 27, 1945 |
| 2,395,518 | Svenson | Feb. 26, 1946 |
| 2,546,687 | Bradenburg | Mar. 27, 1951 |
| 2,713,283 | Lomazzo | July 19, 1955 |

FOREIGN PATENTS

| | | |
|---|---|---|
| 10,960 | Great Britain | 1902 |
| 694,632 | Great Britain | July 22, 1953 |
| 706,856 | Great Britain | Apr. 7, 1954 |
| 736,213 | Germany | Apr. 29, 1943 |
| 273,770 | Switzerland | June 1, 1951 |